April 20, 1948.  A. N. MILSTER  2,440,016
TRACTOR STEERING CONTROL
Filed Jan. 23, 1946
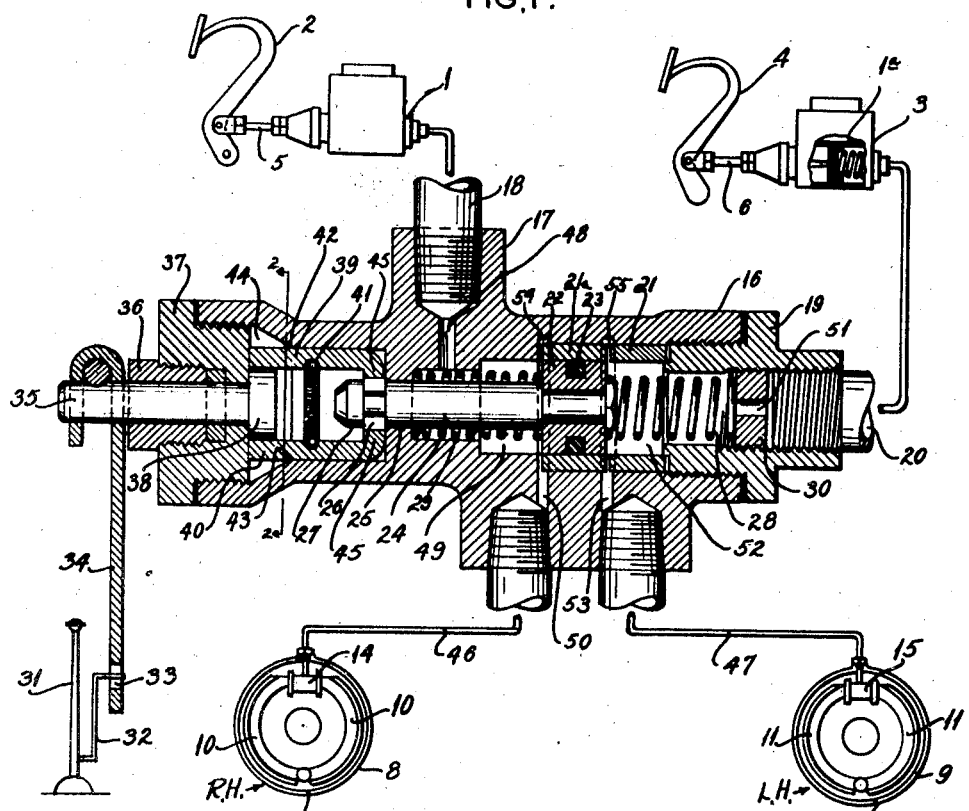
INVENTOR
ARTHUR N. MILSTER
BY
ATTORNEY Patented Apr. 20, 1948

2,440,016

UNITED STATES PATENT OFFICE 2,440,016

TRACTOR STEERING CONTROL

Arthur N. Milster, Ferguson, Mo., assignor to Wagner Electric Corporation, St. Louis, Mo., a corporation of Delaware Application January 23, 1946, Serial No. 642,837

9 Claims. (Cl. 180—17)

This invention is related to tractor steering controls and in its more specific aspects discloses a mechanism employing two manually-operated pressure producing devices with means to selectively actuate one or both of two brake mechanisms associated with the drive wheels of the tractor to assist in the steering thereof.

Another object of the invention is to provide a tractor steering control employing individually manually-operated pressure producers, one for each of two brake mechanisms, and a device connected between the pressure producers and the brake mechanisms whereby under one operative condition of said device both brakes may be equally energized to brake the tractor from either one of said pressure producers, and in which under another operative condition of said device said pressure producers may selectively actuate the two brake mechanisms to assist in the steering of the tractor whenever a manually-operable tractor control is adjusted to certain predetermined positions.

Various devices have been developed in the art for employment in connection with tractors of both dirigible wheel and tractor wheel or tracklaying types of traction elements, in which one of the wheels or treads is left free to rotate while the other is braked in order to assist in the steering of such devices under certain operating conditions. The fluid pressure producers, commercially known as master cylinder, have been proposed to actuate the brakes for both steering assistance and stopping but in any such system embodying more than one standard compensating type of pressure producer, means must be provided to block the compensating portholes of the first pressure producer when the second is in use and vice versa. If this is not done, pressure fluid displaced from either cylinder will escape through the compensating port of the other and no pressure can be built up. This invention discloses means to prevent transfer of fluid from one pressure producer to the other and thereby enables all pressure produced by either pressure producer to be expended on the braking mechanism during operation.

In the drawings

Figure 1 is a schematic view, partly in section, of a tractor steering control;

Figure 2 is a sectional view taken along the line 2—2 of Figure 1;

Figure 3 shows left end parts in Figure 1 in adjusted position; and

Figure 4 shows an exploded view of a portion of the device of Figure 1.

The objects and advantages set forth above are achieved in the structure disclosed in the drawings in which numeral 1 is a manually-operated pressure producer mounted on the vehicle frame and known as a master cylinder, whose detailed construction is set forth in United States Patent No. 1,758,671, issued May 13, 1930, and is operated by a suitably mounted vehicle supported pedal 2. A second pressure producer 3, suitably supported on the tractor frame and similar in construction to pressure producer 1, is likewise actuated by a vehicle supported pedal 4. Piston rods 5 and 6 operatively connect brake pedals 2 and 4 with the pistons in the pressure producers 1 and 3. Each pressure producer is provided with a compensating port 1a whose function is well known in the art.

A control valve 7 is interposed in the connection between the pressure producers 1 and 3 and brake mechanism 8 for the right-hand drive wheel and brake mechanism 9 for the left-hand drive wheel. Each brake mechanism has shoes 10, 10 and 11, 11 pivotally secured to backing plates 12 and 13. Suitable pressure fluid brake operating motors 14 and 15 are associated with backing plates 12 and 13, respectively, to expand brake shoes 10, 10 and 11, 11 into engagement with the brake drum (not shown) customarily associated with the brake assembly.

Valve 7 comprises a suitably shaped housing 16 which has a projection or boss 17 associated therewith in which a suitable conduit 18 is threaded to connect the outlet side of pressure producer 1 with valve 7. The right-hand end of housing 16 has a fitting 19 threaded therein which receives a conduit 20 likewise threaded therein which is connected to the outlet side of pressure producer 3.

Housing 16 is suitably bored to receive sleeves 21 and 21a which are securely brazed therein with gaps 54, 55 between them, these gaps or passageways being comparatively narrow whose length is determined by the length of projection 21b and 21c on sleeves 21 and 21a, respectively, in Figure 4. A piston 22 is slidably received therein and provided with a piston seal or packing ring 23 to prevent the transmission of pressure fluid from one side of the piston to the other. A piston rod 24, which is suitably secured to piston 22, extends to the left and is slidably received in a reduced diameter bore 25 in housing 16. A groove 26 is formed in piston rod 24 and a tapered head 27 is formed on the end of rod 24. Springs 28 and 29 are disposed on opposite sides of the piston with spring 28 acting against a spring tension adjusting screw 30 threaded into the bore of fitting 19. Spring 29 abuts against the wall portion in which the reduced diameter bore 25 is formed and under normal conditions of operation springs 28 and 29 keep the piston centrally disposed with respect to the bore in which said piston 22 slides.

Means have been provided to prevent the movement of piston 22 in its bore under certain conditions of operation of the tractor, it being desired under such conditions that either one of the brake mechanisms 8 and 9 may be operated selectively, thereby assisting in the steering of the tractor and that under all other conditions of operation both brake mechanisms are to be operated by either pressure fluid producer to arrest motion of the tractor.

The foregoing result may be obtained by a mechanism associated with any low speed operation of the tractor or a device driven during slow speed movement thereof but is preferably controlled by a gear shift lever 31 ordinarily associated with the tractor transmission which has a suitable lever 32 operatively associated therewith that is received in slot 33 of a lever 34. This lever is rigidly secured to a shaft 35, associated with valve 7, in order to rotate said shaft in a bushing 36 threaded into a fixture 37 which is threaded or otherwise secured in the left-hand end of housing 16. Lever 34 is appropriately secured to shaft 35 by bending and passing it through suitable apertures formed therein. Shaft 35 has a cam 38 secured thereto which is preferably of the multiple lobe variety and is engageable with a pair of levers 39 and 40 received in a bore formed in housing 16. An expansion spring 41 operatively engages levers 39 and 40 to urge them to the position illustrated in Figure 1. Rotation of cam 38 will cause the levers to pivot about fulcrums 42 and 43, thereby bringing the hooked ends 45 into groove 26 formed in piston rod 24 and the opposite ends of the levers 39 and 40 will assume the positions shown in Figure 3 wherein the cam operated ends of the levers move into the space 44. The condition necessary to bring the hooked ends 45 of levers 39 and 40 into groove 26 is during the low speed adjustment of shift lever 31 or when the tractor is connected to any device operable at or responsive to low tractor speeds, and when shift lever 31 is set to high or any intermediate speed spring 41 will maintain levers 39 and 40 in the positions illustrated in Figure 1.

Conduit 46, which is threaded into housing 16, connects the brake motor 14 therewith, and conduit 47 in like manner connects brake motor 15 with housing 16. A passageway or duct 48 formed in housing 16 permits the transmission of pressure fluid originating in producer 1 to be admitted into space 49 to the left of piston 22 and by means of passageway 54 and duct 50 formed in housing 16 the pressure fluid is conducted from space 49 into conduit 46 to brake motor 14. Pressure fluid developed by pressure producer 3 is transmitted through conduit 20 and is then conducted through bore 51 formed in adjusting screw 30 to a space 52 to the right of piston 22 and thence is conducted through duct or passageway 55 and duct 53 formed in the wall of housing 16 to conduit 47 and then to brake motor 15.

The operation of this device, when used to assist in steering under load and in low speed operation, requires the operator to place the gear shift lever 31 in low gear position. Lever 32, which associates gear shift lever 31 with lever 34, now causes shaft 35 to be rotated to thereby lock piston 22 in the position indicated by bringing hooks 45 on levers 39 and 40 into groove 26 in piston rod 24, as illustrated in Figure 3. Piston 22 will remain in locked position as long as gear shift lever 31 is in low gear position. Under this condition the pressure fluid produced by pressure producer 1 will be transmitted through conduit 18, through duct 48 into space 49, thence through passageway 54 into duct 50 and conduit 46, and to brake motor 14 of brake 8 to brake the right-hand wheel and permit the left-hand drive wheel to continue rotation about the right-hand wheel as a pivot to thereby assist in the steering of the tractor to the right. When it is desired to steer in the opposite direction, pressure producer 3 is actuated whereupon pressure fluid will flow through conduit 20 into space 52, through passage 51, thence through passageway 55 into duct 53, conduit 47, and into brake motor 15, thereby causing the left-hand wheel to be held at rest or have its motion retarded, causing the right-hand wheel to pivot about the left-hand wheel and thereby assist in the steering of the device to the left. When gear shift lever 31 is placed in position for high speed travel or any intermediate speed, cam 38 will not actuate levers 39 and 40, thereby permitting piston 22 to move in its bore into space 49 or 52.

When it is desired to brake both wheels of the tractor, it can be done by actuating either of the pressure producers 1 or 3 whereupon, assuming that pressure producer 1 is actuated, fluid pressure produced thereby will flow through conduit 18, thence through duct 48 into space 49 and will then force the piston to the right until it abuts against the end of fitting 19, thereby placing the pressure fluid produced by producer 1 in communication not only with duct 50 but also with duct 53 and thus transmitting pressure fluid through passageways 54, 55 and conduits 46, 47 to brake motors 14 and 15. The forcing of piston 22 and its packing 23 to the extreme right position prevents the passage of pressure fluid to conduit 20 and out through compensating port 1a into the fluid reservoir associated with pressure producer 3 and causing the entire output of pressure producer 1 to be directed to brake cylinders 14 and 15.

Assuming that pressure producer 3 has been actuated during the high speed condition of the vehicle, the fluid pressure produced thereby will travel through conduit 20, thence through passage 51 into space 52 forcing piston 22 to the left to place passageways 54 and 55 in communication therewith and then through passageway 53 into conduit 47 and also transmitting the pressure fluid produced by producer 3 through duct 50 into conduit 46 to brake motors 15 and 14, respectively, thereby actuating both brakes to stop the vehicle. This movement of piston 22 and packing 23 to the extreme left will prevent fluid displaced by pressure producer 3 passing to pressure producer 1 and thence through compensating port 1a to the fluid reservoir associated with the pressure producers. It will thus be observed that fluid pressure developed in either pressure producer cannot be dissipated through the compensating port 1a of the other pressure producer, as would be the case if conduits 18 and 20 were not sealed from each other by piston 22 and its seal 23.

Having fully described my invention, that which I claim as novel and desire to protect by Letters Patent of the United States is:

1. A tractor steering control comprising a valve having a movable piston therein; two manually-operated pressure fluid producers; brake mechanisms for the right and left-hand drive wheels of a tractor; a manually-operated speed controlling device; and means controlled by said manually-operated device when in certain positions of adjustment to lock said piston in position in said valve to enable said brake mechanisms when selectively actuated to assist in steering the tractor and said manually-operated speed control when in other positions of adjustment enabling either one of said pressure producers to actuate both of said brake mechanisms, said piston preventing transfer of pressure fluid from one pressure producer to the other when either one operates both brake mechanisms.

2. A tractor steering control comprising two manually-operated pressure fluid producing devices; a valve mechanism having a movable piston therein; two brake mechanisms, means to connect said devices to said valve mechanism, each device connected to opposite ends of said valve mechanism and acting on opposite sides of said piston, means to connect each brake mechanism with opposite ends of said valve mechanism; a speed control; means associated with said speed control and engageable with said piston to lock it in position to enable said brake mechanisms to be selectively actuated; and when said piston is freely movable in said valve mechanism both of said brake mechanisms may be operated by either of said pressure fluid producing devices, said piston preventing transmission of pressure fluid from the actuated pressure fluid producing device to the idle pressure fluid producer.

3. A tractor steering control comprising a pair of independently operated brakes each of which is associated with one of the driving wheels of a tractor; a pair of manually-operated pressure fluid producers; a valve; conduit means connected to said valve and to each of said producers and said brake mechanisms; a movable element in said valve so associated with said conduit connections that each of said pressure producers operates one of said brake mechanisms; a speed varying means; and means associated with said valve and connected to said speed varying means to lock said movable element in position under a predetermined adjustment of said speed varying means to enable said manually-operated pressure producers to selectively operate said brake mechanisms, said speed varying means when in other positions of adjustment releasing said movable element, and when either one of said manually-operated pressure fluid producers is operated it moves said movable element in said valve to allow said operated manually-operated producer to actuate both of said brakes, said movable element when moved in said valve segregating said inactive manually-operated pressure producer to prevent the transfer of pressure fluid from the actuated manually-operated device thereto.

4. A tractor steering control comprising a brake mechanism for each driving wheel of a tractor; a pressure fluid actuated motor for each brake mechanism; a separate pressure fluid producer for each brake mechanism; a valve; a piston in said valve, one pressure producer and one motor connected together through said valve and on opposite ends of said piston; a speed controlling device; means operably associated said device and said piston during predetermined speed rates of said tractor to lock said piston for selective operation of said motors and their associated brake mechanisms, said piston being freely movable in said valve during all other tractor speeds and movable to one of two extreme positions in said valve by a selected pressure producer to enable same to actuate both mechanisms, said piston thus preventing transmission of pressure fluid to the idle pressure producer.

5. A tractor steering control comprising a brake mechanism for each of the two traction wheels of a tractor; a first pressure fluid producer, a second pressure fluid producer; a valve mechanism; a first means to establish communication between said first pressure fluid producer and one of said brake mechanisms through said valve mechanism; a second means to establish communication between said second pressure fluid producer and the other of said brake mechanisms through said valve mechanism; a movable member in said valve to prevent the establishment of communication between said pressure fluid producers; and a third means when in one position of adjustment holding said movable member in said valve to enable said brake mechanisms to be selectively operated, said third means when in another position of adjustment releasing said movable member and enabling it to be moved by pressure fluid from one of said pressure fluid producers to enable the last mentioned pressure fluid producer to operate both brake mechanisms.

6. A tractor steering control comprising a pair of brake mechanisms; a first pressure fluid producer to operate one of said brake mechanisms; a second pressure fluid producer to operate the other of said brake mechanisms; a valve interposed between said brake mechanisms and said pressure fluid producers; a movable member in said valve to prevent the establishment of communication between said pressure fluid producers; and means to position said member in said valve so that said pressure fluid producers may selectively operate said brake mechanisms, said member movable in said valve by either of said pressure fluid producers and when said means is dissociated from said member the pressure fluid producer operated positions said member so that both of said brake mechanisms may be operated by said last mentioned pressure fluid producer.

7. A tractor steering control comprising a brake operating motor for each of the two traction wheels of a tractor; a first pressure fluid producer to operate one of said motors; a second pressure fluid producer to operate the other of said motors; a control valve interposed between said motors and said pressure fluid producers; a movable member in said valve to prevent the establishment of communication between said pressure fluid producers; a gear shift lever adjustable to a plurality of positions; and means to connect said lever to said movable member when said lever is in one position of adjustment so that said motors may be individually operated, said member being disconnected from said lever when it is in other positions of adjustment so that said member is movable by pressure fluid derived from either of said pressure fluid producers to enable both motors to be operated by one of said pressure fluid producers.

8. A tractor steering control comprising a motor for the brake mechanisms associated with each of the two drive wheels of a tractor; a pressure fluid producer to operate one of said brake motors; a pressure fluid producer to operate the other of said brake motors; valve means interposed between said pressure fluid producers and said motors; a movable member in said valve to prevent the establishment of communication between said pressure fluid producers; a gear shift lever adjustable to a plurality of positions; and means to connect said lever to said member when the lever is in one position of adjustment to prevent movement of the movable member so that said motors may be individually operated, and when said lever is in other positions of adjustment said movable member is disconnected from said lever so that when one of said pressure fluid producers is operated it will move said member so that both brake motors may be operated by the pressure fluid producer operated.

9. A tractor steering control comprising a brake mechanism for each of the two driving wheels of a tractor; pressure fluid actuated means for each brake mechanism; a pressure fluid producer for each brake mechanism; a valve interposed between said pressure fluid actuated means and said pressure fluid producers; a speed control device adjustable to a plurality of positions; a movable means in said valve; and means to operably associate said speed control device with said movable means so that when said speed control device is in certain adjusted positions said movable means will be so positioned as to enable said brake mechanisms to be independently operated by the associated pressure fluid producer, said speed control device when in other positions of adjustment being dissociated from said movable means so that it may then be moved by either one of said pressure fluid producers, the pressure producer selected then operating both brake mechanisms, and said movable means preventing transmission of pressure fluid to the inactive pressure producer.

ARTHUR N. MILSTER.

REFERENCES CITED

The following references are of record in the file of this patent:

UNITED STATES PATENTS

| Number | Name | Date |
|---|---|---|
| 1,987,435 | Engel | Jan. 8, 1935 |
| 2,362,521 | Acton | Nov. 14, 1944 |
| 2,394,343 | Vorech | Feb. 5, 1946 |